(12) United States Patent
Davis

(10) Patent No.: US 12,446,917 B2
(45) Date of Patent: Oct. 21, 2025

(54) HANDS-FREE ULTRASOUND ASSEMBLY AND SYSTEM

(71) Applicant: Bard Access Systems, Inc., Salt Lake City, UT (US)

(72) Inventor: Zachary S. Davis, Sandy, UT (US)

(73) Assignee: Bard Access Systems, Inc., Salt Lake City, UT (US)

( * ) Notice: Subject to any disclaimer, the term of this patent is extended or adjusted under 35 U.S.C. 154(b) by 29 days.

(21) Appl. No.: 17/487,627

(22) Filed: Sep. 28, 2021

(65) Prior Publication Data

US 2022/0096119 A1    Mar. 31, 2022

Related U.S. Application Data

(60) Provisional application No. 63/085,072, filed on Sep. 29, 2020.

(51) Int. Cl.
*A61B 17/34* (2006.01)
*A61B 8/00* (2006.01)
*A61B 34/20* (2016.01)

(52) U.S. Cl.
CPC ........ *A61B 17/3403* (2013.01); *A61B 8/4455* (2013.01); *A61B 8/461* (2013.01);
(Continued)

(58) Field of Classification Search
CPC ........ A61B 17/3403; A61B 2017/3407; A61B 2017/3413; A61B 2034/2051;
(Continued)

(56) References Cited

U.S. PATENT DOCUMENTS 4,058,114 A    11/1977  Soldner
4,346,717 A     8/1982  Haerten
(Continued)

FOREIGN PATENT DOCUMENTS

WO    WO1998006333 A1 *  2/1998
WO        16068637 A1    5/2016
(Continued)

OTHER PUBLICATIONS

"The ultrasound transducer," 2020, ECG & Echo Learning (Year: 2020).*

(Continued)

*Primary Examiner* — Michael J Carey
*Assistant Examiner* — Maria Christina Talty
(74) *Attorney, Agent, or Firm* — Rutan & Tucker LLP

(57) ABSTRACT

Disclosed herein are hands-free ultrasound probes, assemblies, systems, and methods. An ultrasound-probe assembly, for example, can include an ultrasound probe and a single-use pad coupled to a patient-facing side of the ultrasound probe. The ultrasound probe can include a probe body, a stabilizer extending from the probe body, a probe head including ultrasonic transducers in an array in a patient-facing portion of the probe body, and a needle-guide holder extending from the probe body. The stabilizer is configured for hands-free stabilization of the ultrasound probe when the ultrasound probe is placed on a patient with the pad inter-facing a skin surface of the patient. An ultrasound system can include a console and the foregoing ultrasound-probe assembly. A method can include using the foregoing ultrasound system for hands-free ultrasound imaging while inserting a needle into an anatomical target to establish an insertion site for placement of a vascular access device.

20 Claims, 11 Drawing Sheets

(52) U.S. Cl.
CPC ...... *A61B 34/20* (2016.02); *A61B 2017/3407* (2013.01); *A61B 2017/3413* (2013.01); *A61B 2034/2051* (2016.02)

(58) Field of Classification Search
CPC ..... A61B 34/20; A61B 8/0841; A61B 8/4209; A61B 8/4422; A61B 8/4455; A61B 8/4483; A61B 8/461
See application file for complete search history.

(56) References Cited

U.S. PATENT DOCUMENTS

| | | | |
|---|---|---|---|
| 4,501,278 A | 2/1985 | Yamaguchi et al. | |
| 4,542,747 A | 9/1985 | Zurinski et al. | |
| 4,556,066 A | 12/1985 | Semrow | |
| 4,947,853 A | 8/1990 | Hon | |
| 5,394,877 A | 3/1995 | Orr et al. | |
| 5,427,108 A | 6/1995 | Bollinger | |
| 5,598,845 A | 2/1997 | Chandraratna et al. | |
| 5,626,554 A | 5/1997 | Ryaby et al. | |
| 5,758,650 A | 6/1998 | Miller et al. | |
| 5,924,992 A | 7/1999 | Park et al. | |
| 6,039,694 A | 3/2000 | Larson et al. | |
| 6,132,379 A | 10/2000 | Patacsil et al. | |
| 6,203,499 B1 | 3/2001 | Imling et al. | |
| 6,261,231 B1 | 7/2001 | Damphousse et al. | |
| 6,361,499 B1* | 3/2002 | Bates | A61B 17/3403 600/464 |
| 6,394,960 B1 | 5/2002 | Shinogi et al. | |
| 6,491,657 B2 | 12/2002 | Rowe et al. | |
| 6,790,187 B2 | 9/2004 | Thompson et al. | |
| 7,070,565 B2 | 7/2006 | Vaezy et al. | |
| 7,149,566 B2* | 12/2006 | Lee | A61B 8/0825 600/407 |
| 7,211,060 B1 | 5/2007 | Talish et al. | |
| 7,244,234 B2 | 7/2007 | Ridley et al. | |
| 7,429,248 B1 | 9/2008 | Winder et al. | |
| 7,766,839 B2 | 8/2010 | Rogers et al. | |
| 7,837,627 B1 | 11/2010 | Pruter | |
| 7,883,468 B2 | 2/2011 | Makin et al. | |
| 7,931,596 B2 | 4/2011 | Rachlin et al. | |
| 8,147,408 B2 | 4/2012 | Bunce et al. | |
| 8,231,533 B2 | 7/2012 | Buchalter | |
| 8,388,541 B2 | 3/2013 | Messerly et al. | |
| 8,409,100 B2 | 4/2013 | Caberg et al. | |
| 8,781,555 B2 | 7/2014 | Burnside et al. | |
| 8,849,382 B2 | 9/2014 | Cox et al. | |
| 8,939,911 B2 | 1/2015 | Kosaku | |
| 9,050,053 B2 | 6/2015 | Morgan | |
| 9,456,766 B2 | 10/2016 | Cox et al. | |
| 9,480,863 B2 | 11/2016 | Lewis, Jr. et al. | |
| 9,492,097 B2 | 11/2016 | Wilkes et al. | |
| 9,521,961 B2 | 12/2016 | Silverstein et al. | |
| 9,554,716 B2 | 1/2017 | Burnside et al. | |
| 9,636,031 B2 | 5/2017 | Cox | |
| 9,649,048 B2 | 5/2017 | Cox et al. | |
| 10,449,330 B2 | 10/2019 | Newman et al. | |
| 10,524,691 B2 | 1/2020 | Newman et al. | |
| 10,751,509 B2 | 8/2020 | Misener | |
| 10,863,970 B2 | 12/2020 | Oberg et al. | |
| 2004/0064051 A1 | 4/2004 | Talish et al. | |
| 2004/0234453 A1 | 11/2004 | Smith | |
| 2005/0090725 A1 | 4/2005 | Page et al. | |
| 2005/0215901 A1 | 9/2005 | Anderson et al. | |
| 2009/0321457 A1 | 12/2009 | Baril | |
| 2010/0041990 A1* | 2/2010 | Schlitt | A61B 17/3403 600/461 |
| 2010/0076315 A1 | 3/2010 | Erkamp et al. | |
| 2010/0174185 A1* | 7/2010 | Wang | A61B 8/0841 600/562 |
| 2010/0312121 A1 | 12/2010 | Guan | |
| 2011/0113886 A1 | 5/2011 | Elejalde et al. | |
| 2011/0264012 A1* | 10/2011 | Lautzenhiser | G10K 11/02 601/2 |
| 2012/0065479 A1 | 3/2012 | Lahiji et al. | |
| 2012/0209114 A1 | 8/2012 | Staalsen et al. | |
| 2013/0060143 A1 | 3/2013 | LaPlante et al. | |
| 2013/0144193 A1 | 6/2013 | Lewis, Jr. et al. | |
| 2013/0165005 A1 | 6/2013 | Berard-Andersen et al. | |
| 2013/0289411 A1 | 10/2013 | Barnard et al. | |
| 2014/0200445 A1 | 7/2014 | Boezaart et al. | |
| 2014/0235725 A1 | 8/2014 | Morgan | |
| 2015/0135840 A1 | 5/2015 | Sato et al. | |
| 2015/0238166 A1* | 8/2015 | Heath | A61B 8/10 351/205 |
| 2015/0245822 A1 | 9/2015 | Kim et al. | |
| 2016/0128670 A1 | 5/2016 | Morgan | |
| 2016/0199027 A1* | 7/2016 | Scully | A61B 8/4281 424/9.5 |
| 2016/0242736 A1 | 8/2016 | Freiburg et al. | |
| 2017/0196591 A1* | 7/2017 | Long, Jr. | A61B 90/11 |
| 2018/0263597 A1* | 9/2018 | Tchang | A61B 90/50 |
| 2019/0053784 A1* | 2/2019 | Beri | A61B 8/4218 |
| 2019/0059854 A1* | 2/2019 | Radl | A61B 8/4455 |
| 2019/0125397 A1* | 5/2019 | Arnold | A61B 17/3403 |
| 2019/0365348 A1* | 12/2019 | Toume | A61B 8/065 |
| 2020/0155117 A1* | 5/2020 | Acuna | A61B 8/4209 |
| 2022/0039829 A1* | 2/2022 | Zijlstra | A61B 8/462 |

FOREIGN PATENT DOCUMENTS

| | | |
|---|---|---|
| WO | 16207889 A1 | 12/2016 |
| WO | 2020/067897 A1 | 4/2020 |

OTHER PUBLICATIONS

PCT/US2021/052387 filed Sep. 28, 2021 International Search Report and Written Opinion dated Jan. 13, 2022.

* cited by examiner

HANDS-FREE ULTRASOUND ASSEMBLY AND SYSTEM

PRIORITY

This application claims the benefit of priority to U.S. Provisional Patent Application No. 63/085,072, filed Sep. 29, 2020, which is incorporated by reference in its entirety into this application.

BACKGROUND

A variety of ultrasound systems exist including wired or wireless ultrasound probes. Whether wired or wireless, an ultrasound system such as the foregoing requires a clinician to hold and manipulate an ultrasound probe with one hand while ultrasound imaging and, with the other hand, simultaneously establish an insertion site with a needle, place a vascular access device ("VAD") such as a catheter in the insertion site, or the like. Having to use both hands while ultrasound imaging and either establishing an insertion site or placing a VAD therein can be difficult, particularly for less experienced clinicians. For example, a clinician can miss a target blood vessel when attempting to establish an insertion site and, thereby, cause discomfort or pain to a patient. Ultrasound systems with hands-free ultrasound probes are therefore needed. Indeed, with hands-free ultrasound imaging clinicians would be able to use both hands for establishing insertion sites and placing a VADs therein.

Disclosed herein are hands-free ultrasound probes, assemblies, systems, and methods.

SUMMARY

Disclosed is an ultrasound-probe assembly including, in some embodiments, an ultrasound probe and a single-use pad coupled to a patient-facing side of the ultrasound probe. The ultrasound probe includes a probe body, a stabilizer extending from the probe body, a probe head in a patient-facing portion of the probe body, and a needle-guide holder extending from the probe body. The stabilizer is configured for hands-free stabilization of the ultrasound probe when the ultrasound probe is placed on a patient. The probe head includes ultrasonic transducers in an array. The pad is configured to interface with a skin surface of the patient.

In some embodiments, the needle-guide holder extends from the probe body, along the stabilizer, and toward a center of the stabilizer.

In some embodiments, the needle-guide holder is configured to rotate toward and away from the patient-facing side of the ultrasound probe for different needle-insertion angles with a needle disposed in a needle through hole of a needle guide coupled to the needle-guide holder.

In some embodiments, the probe body and the needle-guide holder include complementary locking features where the needle-guide holder extends from the probe body. The locking features are configured to lock the needle-guide holder in different positions for the different needle-insertion angles.

In some embodiments, the ultrasound-probe assembly further includes one or more needle guides. The one-or-more needle guides are configured to attach to the needle-guide holder. Each needle guide of the one-or-more needle guides includes a needle through hole configured to direct a needle into the patient under the probe head.

In some embodiments, each needle guide of the one-or-more needle guides is configured for inserting the needle into the patient at a different needle-insertion angle.

In some embodiments, the stabilizer includes two arcuate stabilizer arms extending from opposite sides of the probe body.

In some embodiments, each stabilizer arm of the two stabilizer arms includes hooks in a patient-facing side of the stabilizer fastening the stabilizer to the pad.

In some embodiments, the pad includes two arcuate pad arms coextensive with the two stabilizer arms. Each pad arm of the two pad arms includes wells in a clinician-facing side of the pad. The hooks are correspondingly disposed in the wells under latches partially covering the wells.

In some embodiments, each pad arm of the two pad arms connect under the probe head. The pad includes an ultrasound window configured to allow generated ultrasound signals to be emitted from the ultrasonic transducers and reflected ultrasound signals to be received by the ultrasonic transducers.

In some embodiments, a patient-facing portion of the pad is formed of a conformable material for patient comfort.

In some embodiments, the pad includes an adhesive configured to adhere the pad to the skin surface of the patient.

In some embodiments, the patient-facing portion of the pad is contoured with an outer portion of the pad thicker than an inner portion of the pad such that the pad conforms with the skin surface of the patient.

In some embodiments, the patient-facing portion of the pad includes two contoured pad-arm extensions extending away from the stabilizer. The two pad-arm extensions are configured to conformably straddle a limb of the patient.

In some embodiments, the ultrasound probe further includes one or more magnetic sensors. The one-or-more magnetic sensors are configured to detect changes in a magnetic field of a magnetized needle for visual guidance of the needle to an anatomical target on a display screen while ultrasonically imaging the anatomical target.

Also disclosed herein is an ultrasound system including a console and an ultrasound-probe assembly. The console includes a display configured to render ultrasound images on a display screen of the display. The ultrasound-probe assembly includes an ultrasound probe and a single-use pad coupled to a patient-facing side of the ultrasound probe. The ultrasound probe includes a probe body, a stabilizer extending from the probe body, a probe head in a patient-facing portion of the probe body, and a needle-guide holder extending from the probe body. The stabilizer is configured for hands-free stabilization of the ultrasound probe when the ultrasound probe is placed on a patient. The probe head includes ultrasonic transducers in an array. The pad is configured to interface with a skin surface of the patient.

In some embodiments, the console and the display are further configured to provide visual guidance for a magnetized needle of the ultrasound-probe assembly to an anatomical target on the display screen of the display. The ultrasound probe further includes one or more magnetic sensors configured to detect changes in a magnetic field of the needle for the visual guidance.

Also disclosed herein is a method of an ultrasound system including, in some embodiments, an obtaining step, an assembling step, a moving step, a monitoring step, and a needle-inserting step. The obtaining step includes obtaining an ultrasound probe. The ultrasound probe includes a probe body, a stabilizer extending from the probe body, and a probe head in a patient-facing portion of the probe body. The assembling step includes fastening a single-use pad to a patient-facing side of the ultrasound probe to form an ultrasound-probe assembly. The moving step includes moving the ultrasound-probe assembly over the patient while the ultrasound probe emits generated ultrasound signals into the patient from ultrasonic transducers in an array in the probe head and receives reflected ultrasound signals from the patient by the ultrasonic transducers. The monitoring step includes monitoring ultrasound images on a display screen of the ultrasound system to identify an anatomical target of the patient. The needle-inserting step includes inserting a needle into the anatomical target while the ultrasound-probe assembly is stabilized by the stabilizer with hands-free stabilization over the anatomical target.

In some embodiments, the assembling step includes inserting hooks of a patient-facing side of the stabilizer into wells of a clinician-facing side of the pad and sliding the hooks under latches partially covering the wells.

In some embodiments, the method further includes an adhering step. The adhering step includes adhering the pad to the patient over the anatomical target after identifying the anatomical target during the monitoring step. The pad includes an adhesive for the adhering of the pad to the patient in the adhering step.

In some embodiments, the method further include an attaching step. The attaching step includes attaching a needle guide to a needle-guide holder extending from the probe body. The needle guide includes a needle through hole configured to direct the needle into the patient under the probe head.

In some embodiments, the needle guide is selected from one or more other needle guides for the needle-inserting step at a particular needle-insertion angle.

In some embodiments, the method further includes a rotating step. The rotating step include rotating the needle-guide holder toward or away from the patient-facing side of the ultrasound probe for the needle-inserting step at a particular needle-insertion angle.

In some embodiments, the rotating step includes locking the needle-guide holder in position at the particular needle-insertion angle. The probe body and the needle-guide holder include complementary locking features where the needle-guide holder extends from the probe body.

In some embodiments, the method further includes another monitoring step. The other monitoring step includes monitoring visual guidance of the needle on the display screen. The ultrasound probe further includes one or more magnetic sensors configured to detect changes in a magnetic field of the needle, when magnetized, for the visual guidance.

These and other features of the concepts provided herein will become more apparent to those of skill in the art in view of the accompanying drawings and following description, which describe particular embodiments of such concepts in greater detail.

DRAWINGS

DESCRIPTION

Figure 1:
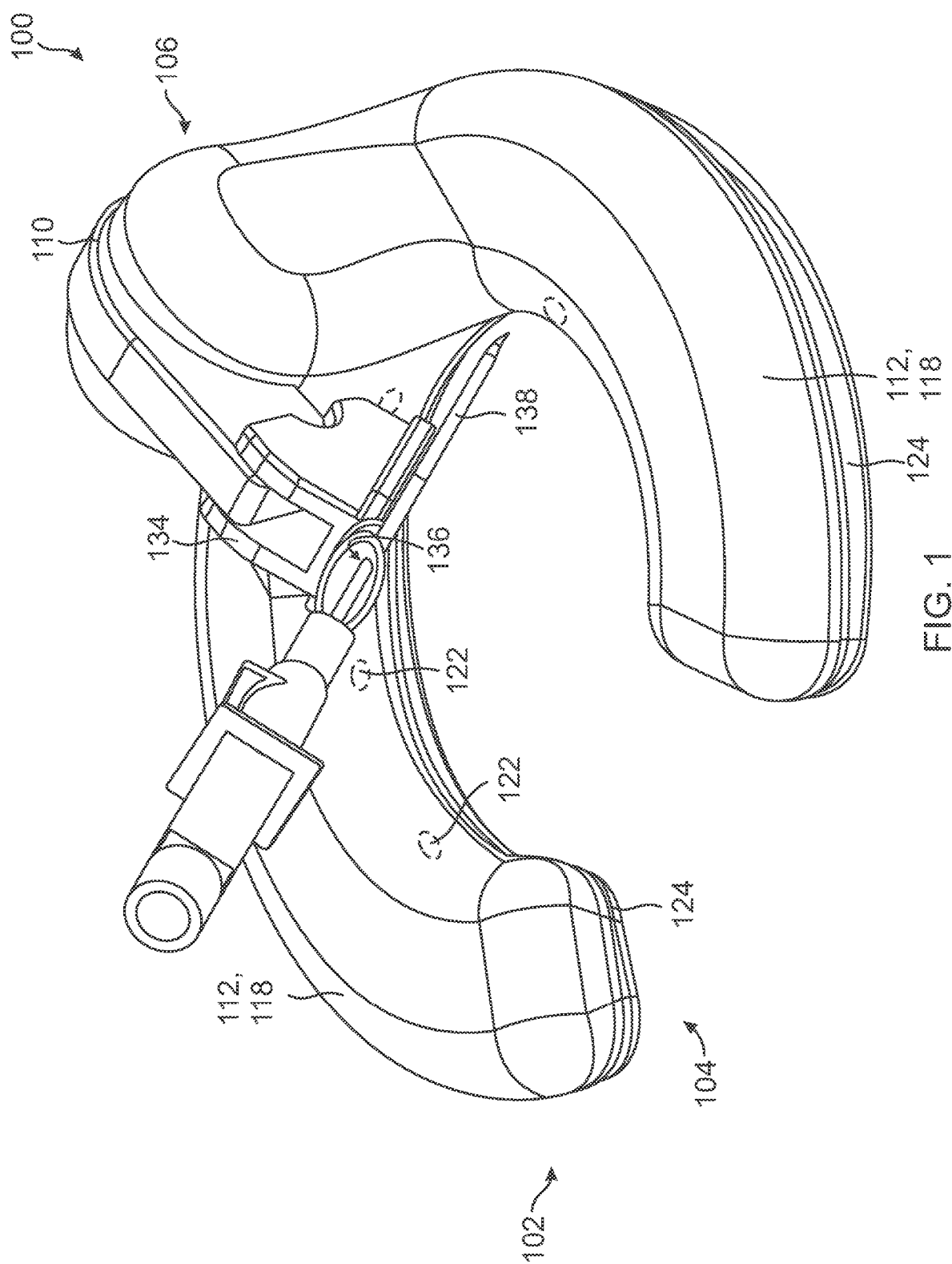
FIG. 1 illustrates a perspective view of a first ultrasound-probe assembly including a first ultrasound probe and a first single-use pad coupled thereto in accordance with some embodiments.

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. In addition, any of the foregoing features or steps can, in turn, further include one or more features or steps unless indicated otherwise. Labels such as "left," "right," "top," "bottom," "front," "back," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise.

With respect to "proximal," a "proximal portion" or a "proximal-end portion" of, for example, a catheter includes a portion of the catheter intended to be near a clinician when the catheter is used on a patient. Likewise, a "proximal length" of, for example, the catheter includes a length of the catheter intended to be near the clinician when the catheter is used on the patient. A "proximal end" of, for example, the catheter includes an end of the catheter intended to be near the clinician when the catheter is used on the patient. The proximal portion, the proximal-end portion, or the proximal length of the catheter can include the proximal end of the catheter; however, the proximal portion, the proximal-end portion, or the proximal length of the catheter need not include the proximal end of the catheter. That is, unless context suggests otherwise, the proximal portion, the proximal-end portion, or the proximal length of the catheter is not a terminal portion or terminal length of the catheter.

With respect to "distal," a "distal portion" or a "distal-end portion" of, for example, a catheter includes a portion of the catheter intended to be near or in a patient when the catheter is used on the patient. Likewise, a "distal length" of, for example, the catheter includes a length of the catheter intended to be near or in the patient when the catheter is used on the patient. A "distal end" of, for example, the catheter includes an end of the catheter intended to be near or in the patient when the catheter is used on the patient. The distal portion, the distal-end portion, or the distal length of the catheter can include the distal end of the catheter; however, the distal portion, the distal-end portion, or the distal length of the catheter need not include the distal end of the catheter. That is, unless context suggests otherwise, the distal portion, the distal-end portion, or the distal length of the catheter is not a terminal portion or terminal length of the catheter.

Lastly, in the following description, the terms "or" and "and/or" as used herein are to be interpreted as inclusive or meaning any one or any combination. As an example, "A, B, or C" or "A, B, and/or C" mean "any of the following: A; B; C; A and B; A and C; B and C; A, B, and C." An exception to this definition will occur only when a combination of elements, components, functions, steps or acts are in some way inherently mutually exclusive.

Unless defined otherwise, all technical and scientific terms used herein have the same meaning as commonly understood by those of ordinary skill in the art.

As set forth above, a variety of ultrasound systems exist including wired or wireless ultrasound probes. Whether wired or wireless, an ultrasound system such as the foregoing requires a clinician to hold and manipulate an ultrasound probe with one hand while ultrasound imaging and, with the other hand, simultaneously establish an insertion site with a needle, place a VAD such as a catheter in the insertion site, or the like. Having to use both hands while ultrasound imaging and either establishing an insertion site or placing a VAD therein can be difficult, particularly for less experienced clinicians. For example, a clinician can miss a target blood vessel when attempting to establish an insertion site and, thereby, cause discomfort or pain to a patient. Ultrasound systems with hands-free ultrasound probes are therefore needed. Indeed, with hands-free ultrasound imaging clinicians would be able to use both hands for establishing insertion sites and placing a VADs therein.

Disclosed herein are hands-free ultrasound probes, assemblies, systems, and methods. In an example, an ultrasound-probe assembly can include an ultrasound probe and a single-use pad coupled to a patient-facing side of the ultrasound probe. The ultrasound probe can include a probe body, a stabilizer extending from the probe body, a probe head including ultrasonic transducers in an array in a patient-facing portion of the probe body, and a needle-guide holder extending from the probe body. The stabilizer is configured for hands-free stabilization of the ultrasound probe when the ultrasound probe is placed on a patient with the pad interfacing a skin surface of the patient. In another example, an ultrasound system can include a console and the foregoing ultrasound-probe assembly. In yet another example, a method can include using the foregoing ultrasound system for hands-free ultrasound imaging while inserting a needle into an anatomical target to establish an insertion site for placement of a VAD. These and other features of the hands-free ultrasound probes, assemblies, systems, and methods provided herein will become more apparent to those of skill in the art in view of the accompanying drawings and following description, which describe particular embodiments of the foregoing ultrasound probes, assemblies, systems, and methods in greater detail.

Ultrasound Probe Assemblies

Figure 2:
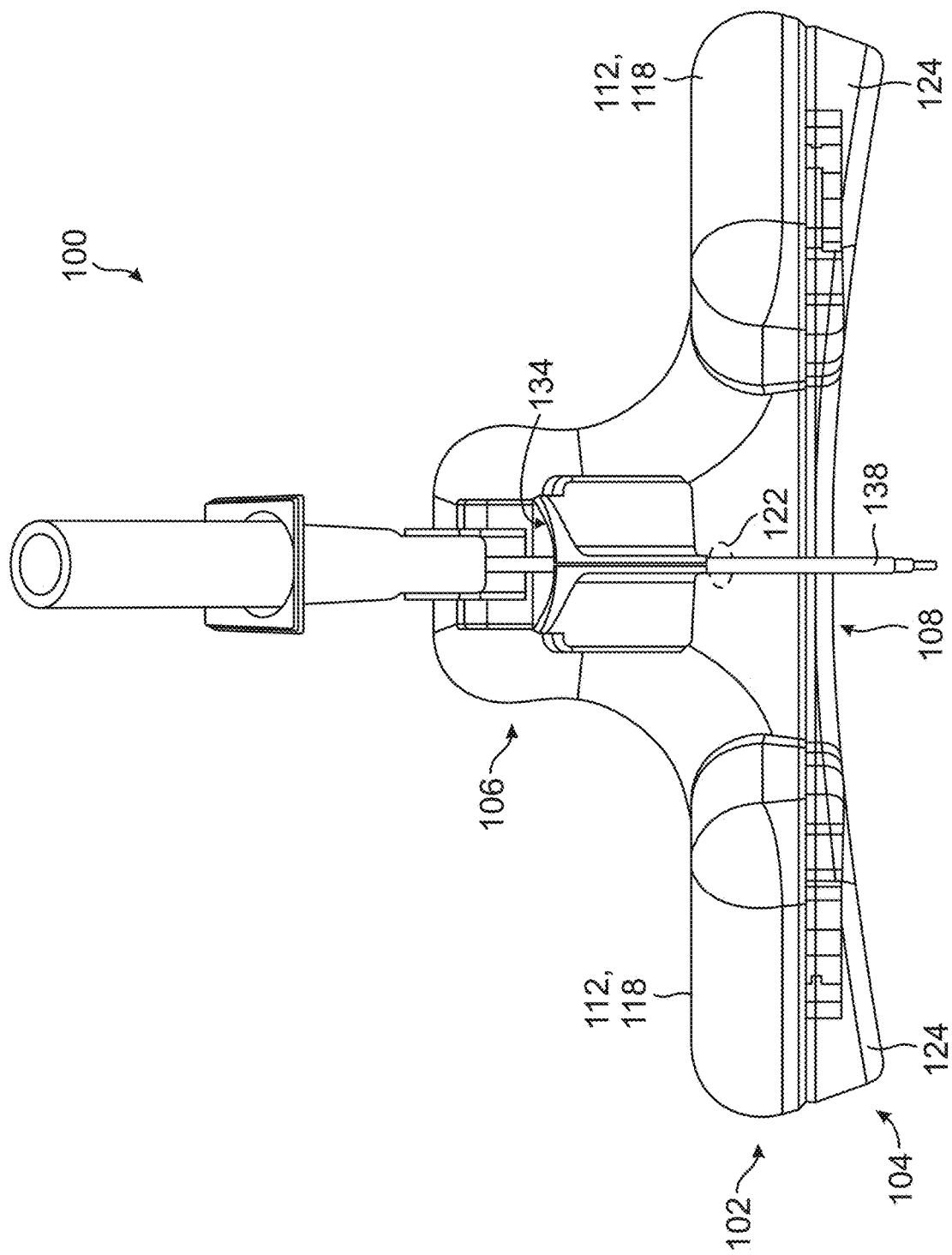
FIG. 2 illustrates a front view of the ultrasound-probe assembly of FIG. 1.
Figure 3:
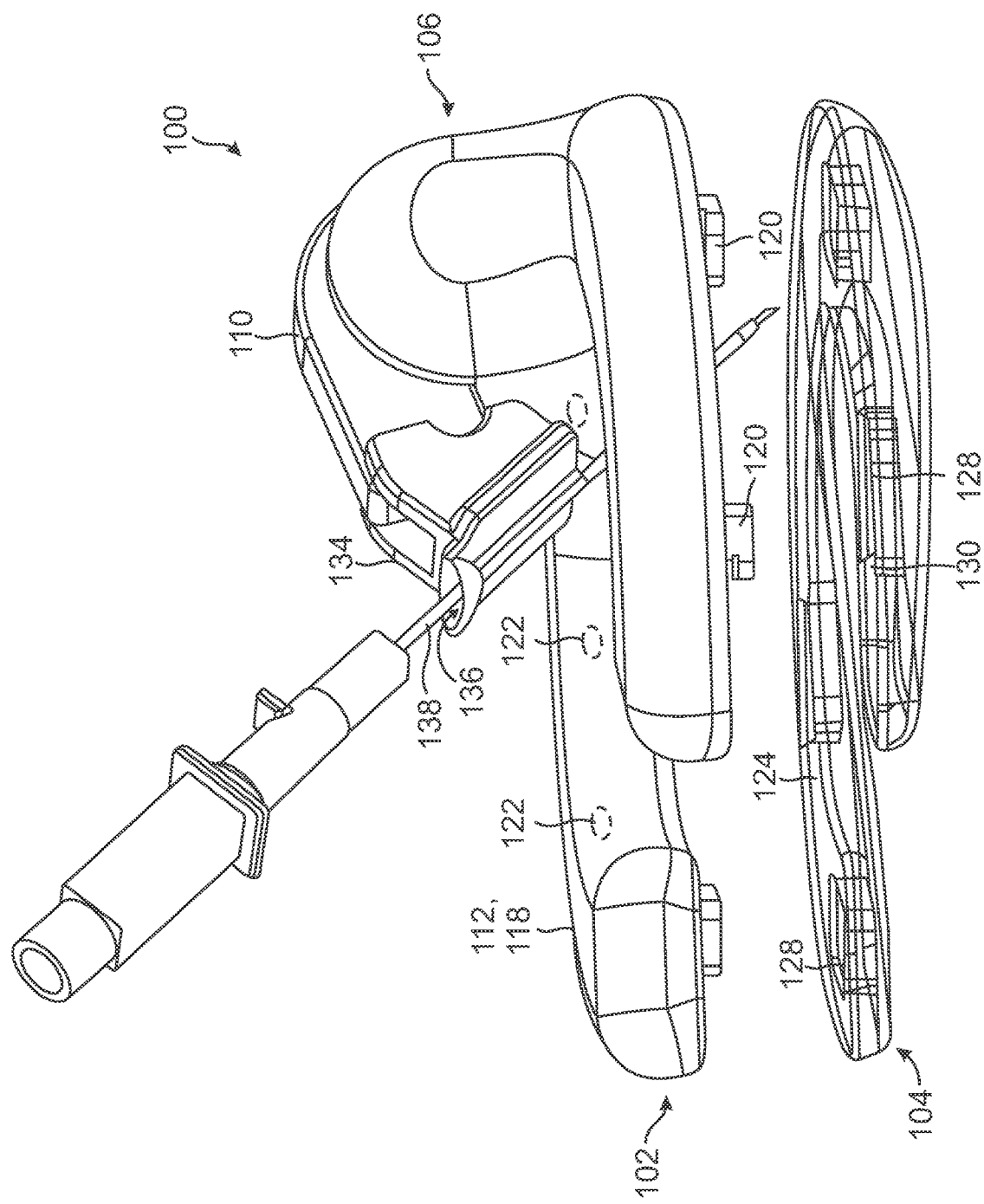
FIG. 3 illustrates an exploded view of the ultrasound-probe assembly of FIG. 1.
Figure 4:
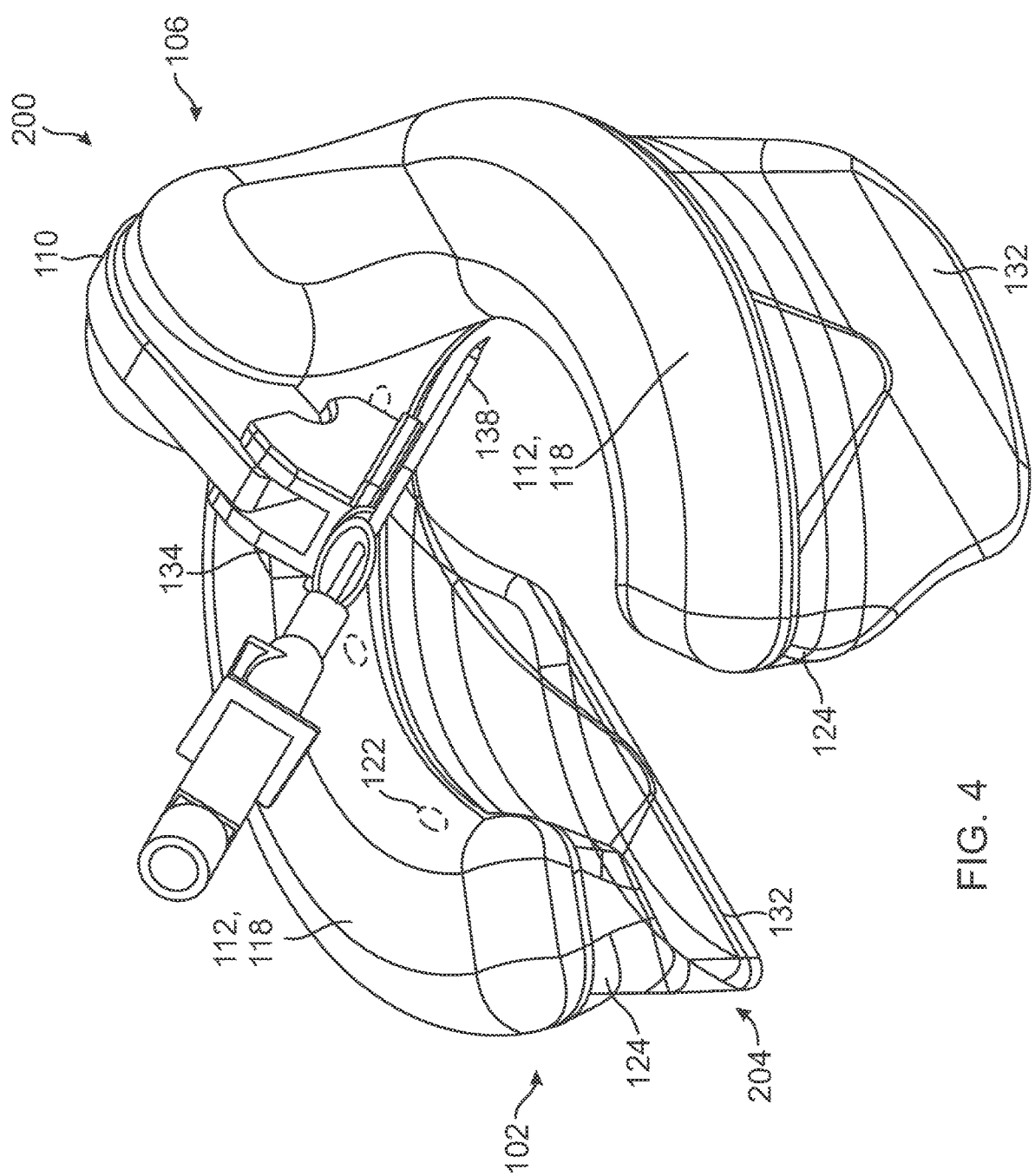
FIG. 4 illustrates a perspective view of a second ultrasound-probe assembly including the first ultrasound probe and a second single-use pad coupled thereto in accordance with some embodiments.
Figure 5:
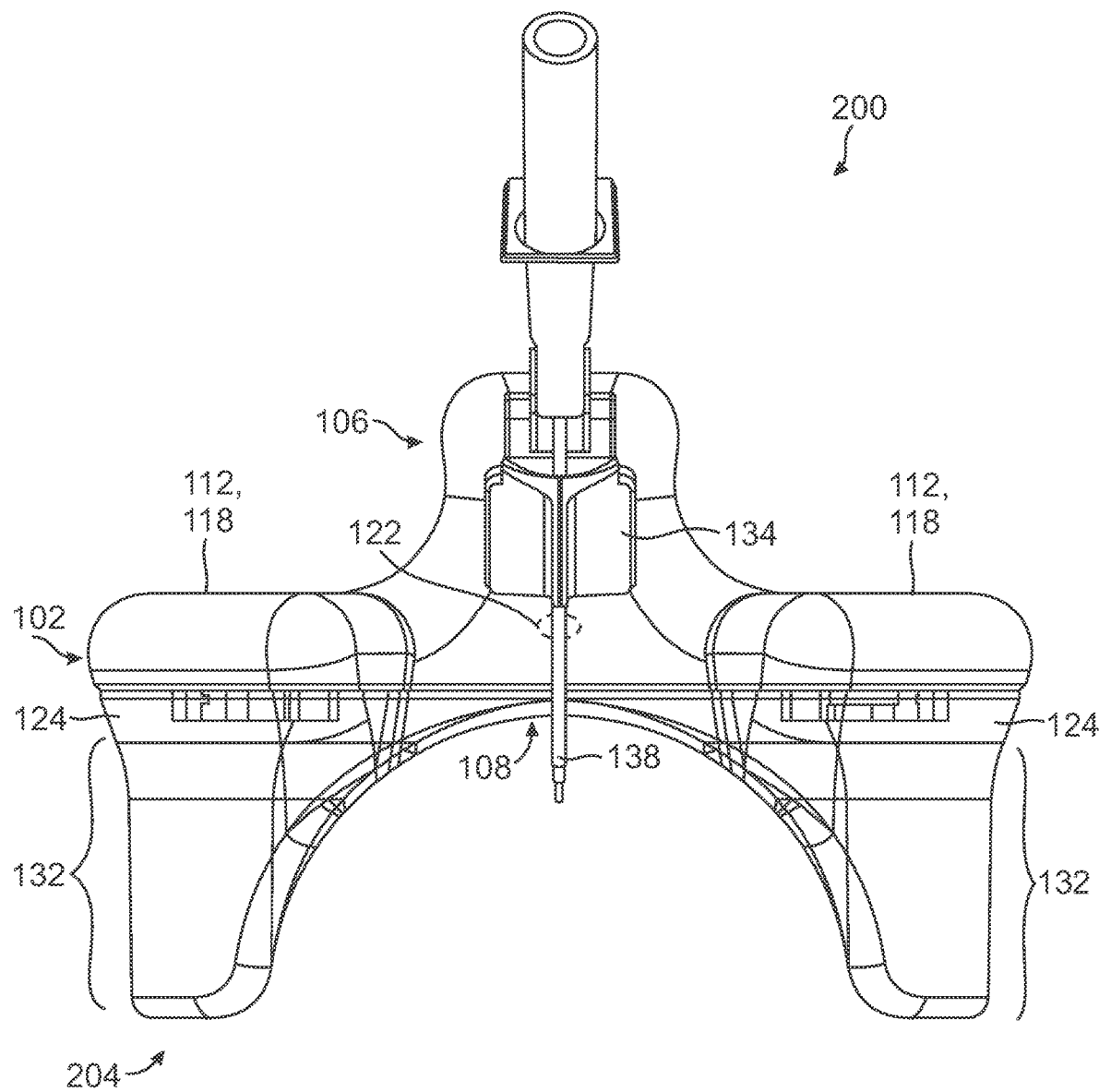
FIG. 5 illustrates a front view of the ultrasound-probe assembly of FIG. 4.
Figure 6:
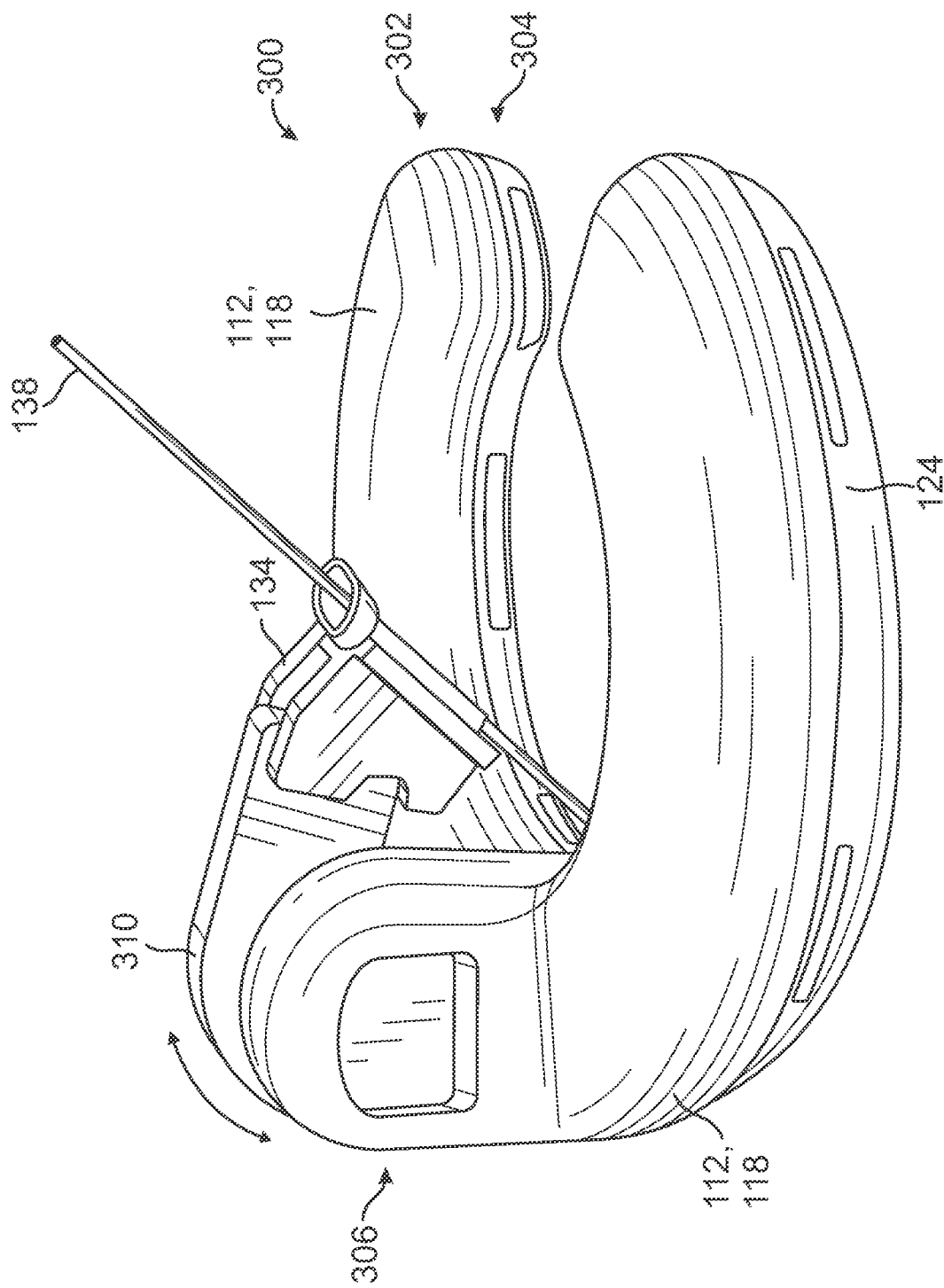
FIG. 6 illustrates a perspective view of a third ultrasound-probe assembly including a second ultrasound probe and a third single-use pad coupled thereto in accordance with some embodiments.
Figure 7:
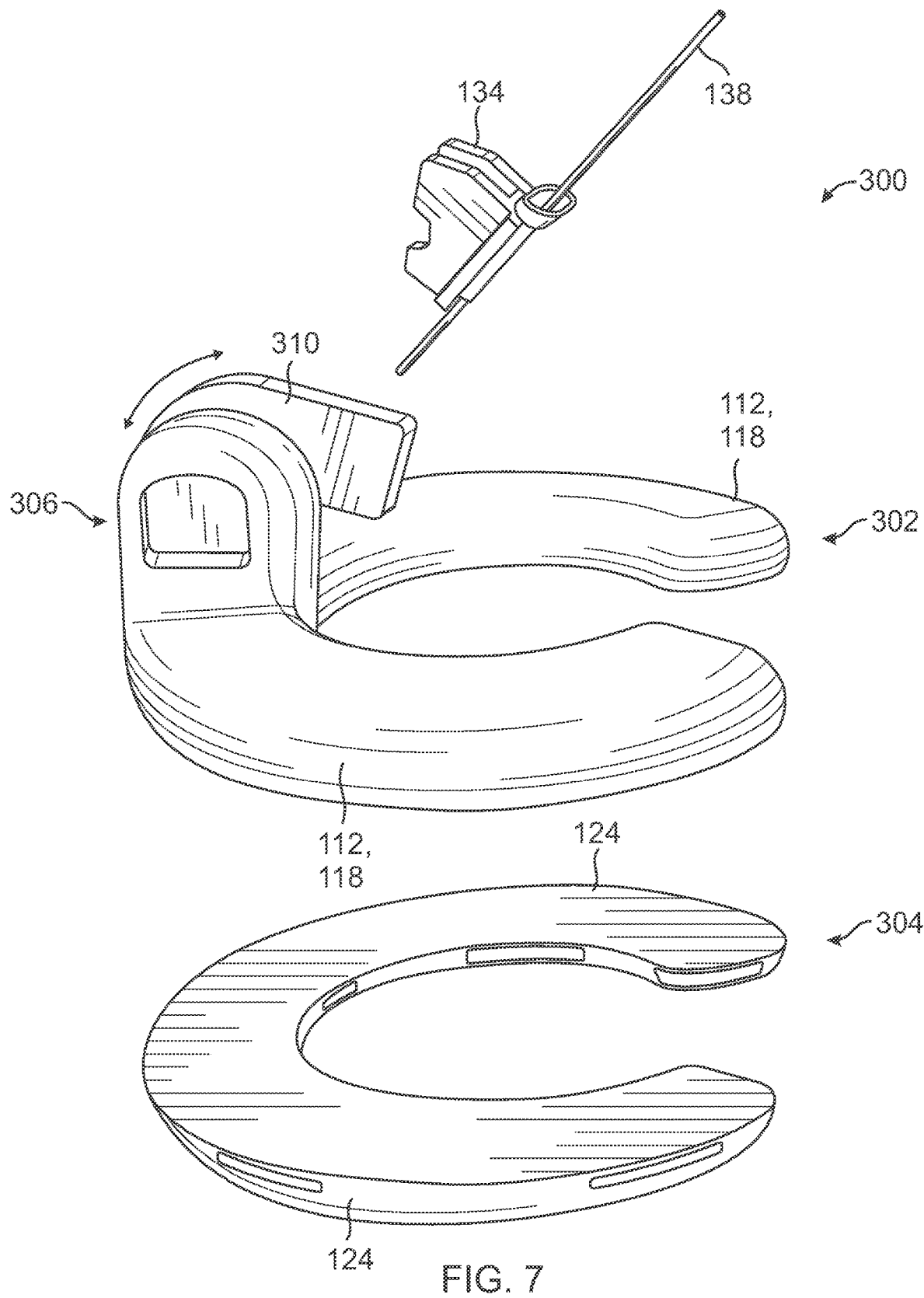
FIG. 7 illustrates an exploded view of the ultrasound-probe assembly of FIG. 6.
Figure 8:
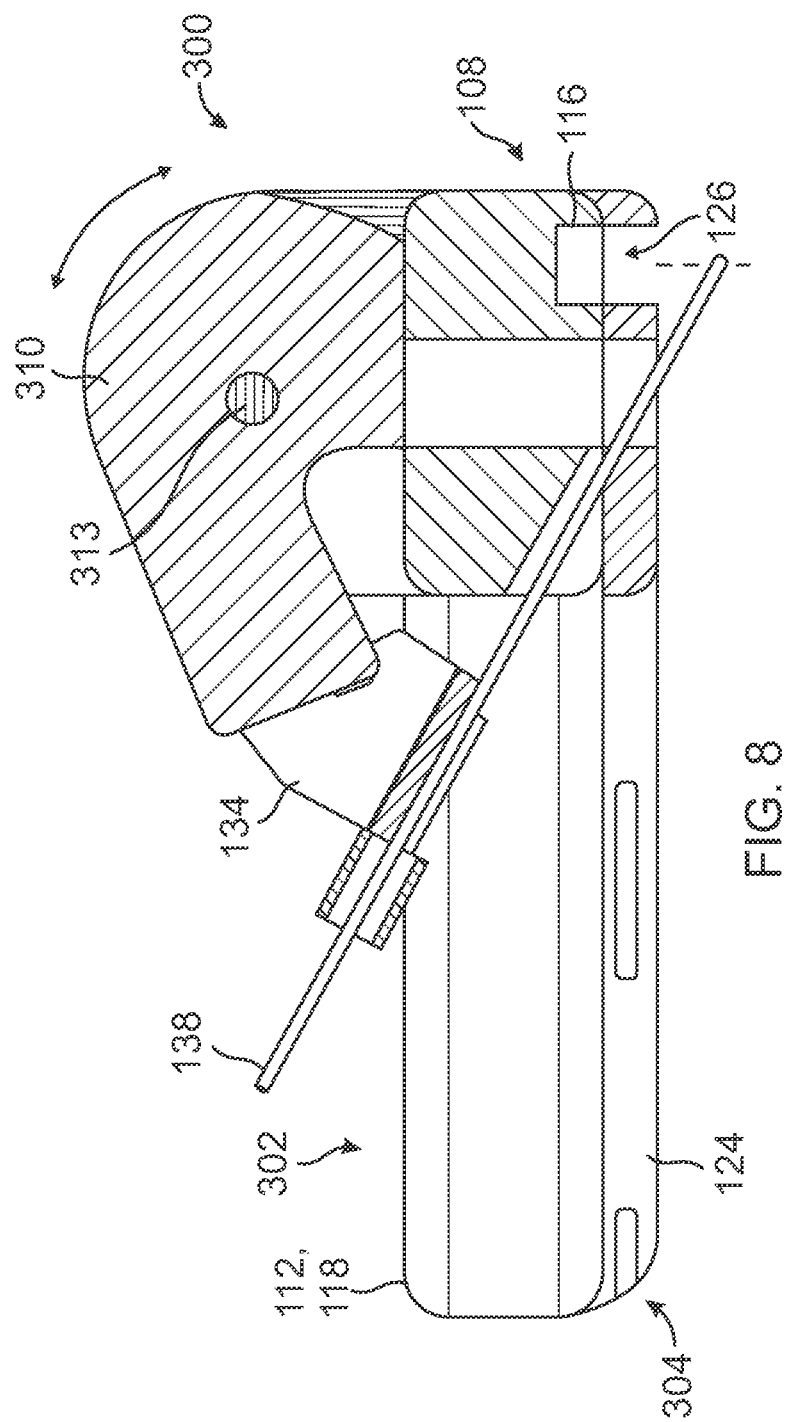
FIG. 8 illustrates a cross-sectional view of the ultrasound-probe assembly of FIG. 6.
Figure 9:
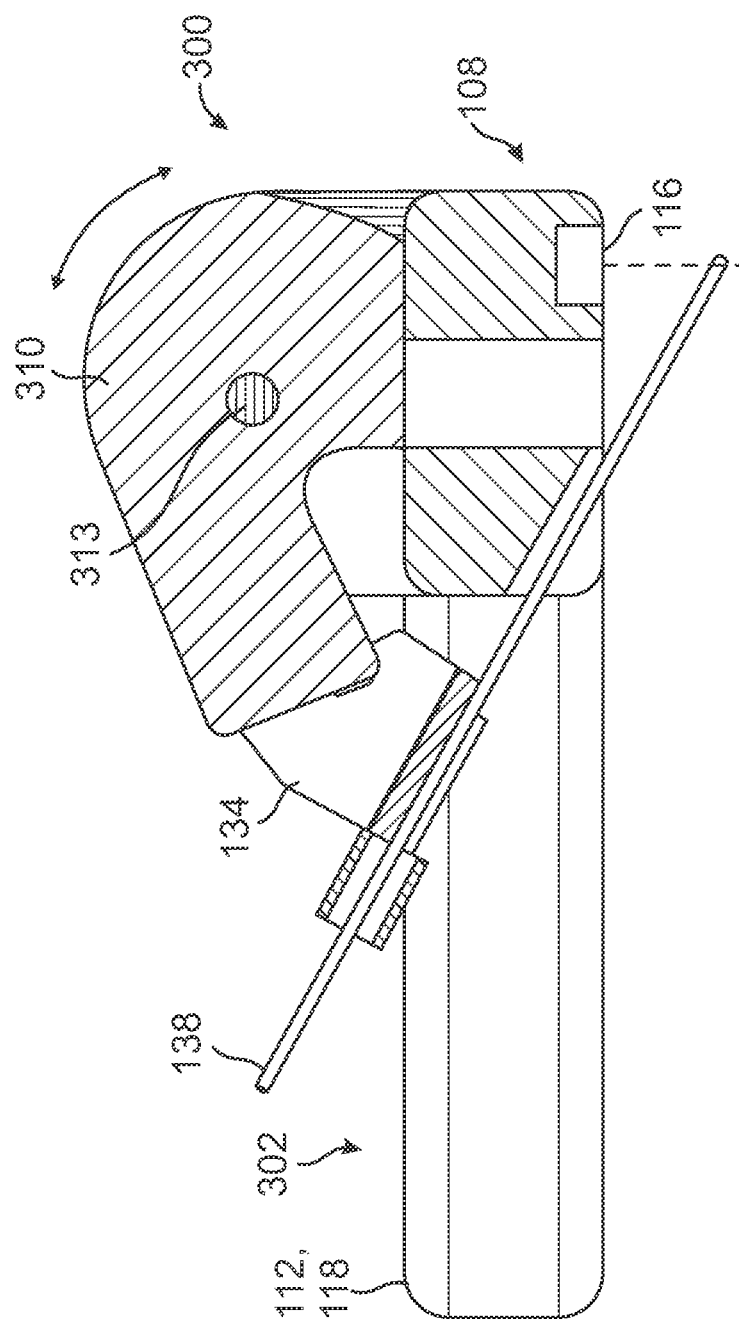
FIG. 9 illustrates a cross-sectional view of the ultrasound probe of FIG. 6 decoupled from the pad.

FIGS. 1-3 illustrate various views of a first ultrasound-probe assembly 100 in accordance with some embodiments; FIGS. 4 and 5 illustrate various views of a second ultrasound-probe assembly 200 in accordance with some embodiments; and FIGS. 6-8 illustrate various views of a third ultrasound-probe assembly 300 in accordance with some embodiments. Notably, FIGS. 9 and 10 respectively illustrate the ultrasound probe 302 and the single-use pad 304 of the ultrasound-probe assembly 300.

As shown, the ultrasound-probe assemblies 100 and 200 include a same ultrasound probe 102 but different single-use pads 104 and 204 coupled to a patient-facing side of the ultrasound probe 102. The ultrasound-probe assembly 300 includes an ultrasound probe 302 and a single-use pad 304 akin to the pad 104 coupled to the patient-facing side of the ultrasound probe 302.

The ultrasound probe 102 or 302 includes a probe body 106 or 306, a probe head 108 in a patient-facing portion of the probe body 106 or 306, a needle-guide holder 110 or 310 extending from the probe body 106 or 306, and a stabilizer 112 extending from the probe body 106 or 306.

The probe body 106 or 306 constitutes a central portion of a housing of the ultrasound probe 102 or 302, the probe head 108 being in the patient-facing portion of the probe body 106 or 306, the needle-guide holder 110 or 310 extending from the probe body 106 or 306, and the stabilizer 112 extending from the probe body 106 or 306, as set forth above. As the central portion of the housing of ultrasound probe 102 or 302, the probe body 106 or 306 houses a number of electronic components of the ultrasound probe 102 or 302. In an example, the probe body 106 or 306 can house a printed circuit board assembly ("PCBA") including a number of integrated circuits configured for wired or wireless operation of the ultrasound probe 102 or 302. In another example, the probe body 106 or 306 can house or otherwise include therein the one-or-more magnetic sensors 122 set forth below, the one-or-more magnetic sensors 122 communicatively coupled to the PCBA and oriented to sense magnetic signals in a same direction as that in which the needle-guide holder 110 or 310 extends from the probe body 106 or 306.

When a rotatable needle-guide holder 310 like that of the ultrasound probe 302 is present, the probe body 306 can include a locking feature complementing that of the needle-guide holder 310 about where the needle-guide holder 310 extends from the probe body 306. For example, the probe body 306 can include an axle 313 disposed in a pair of opposing through holes respectively in a pair of inward-facing faces of the probe body 306, upon which axle 313 the needle-guide holder 310 is rotatably mounted. In addition, at least one face of the inward-facing faces can include teeth molded therein extending radially from the through hole thereof, the teeth complementing those of the needle-guide holder 310, thereby forming a Hirth joint therebetween. Such a locking feature is configured to lock the needle-guide holder 310 in any one of a number of different positions corresponding to different needle-insertion angles. Otherwise, a fixed needle-guide holder 110 like that of the ultrasound probe 102 is molded together with the probe body 106.

The probe head 108 is configured for placement against skin of a patient such as proximate a prospective VAD placement site. The probe head 108 includes ultrasonic transducers 114 in an array and a patient-facing acoustic lens 116 configured to focus generated ultrasound signals emitted by the ultrasonic transducers 114 on an anatomical target such as a blood vessel. Indeed, the ultrasonic transducers 114, which can be piezoelectric ultrasonic transducers, capacitive micromachined ultrasonic transducers ("CMUTs"), or the like, are configured to generate and emit the generated ultrasound signals into the patient in a number of pulses, receive reflected ultrasound signals or ultrasound echoes from the patient by way of reflection of the generated ultrasonic pulses by the body of the patient, and convert the reflected ultrasound signals into corresponding electrical signals for processing into ultrasound images.

The needle-guide holder 110 or 310 extends from the probe body 106 or 306, along sides (e.g., the stabilizer arms 118) of the stabilizer 112, and toward a center of the stabilizer 112. Such a needle-guide holder can be fixed with respect to its position like the needle-guide holder 110 of the ultrasound probe 102, which needle-guide holder 110 is molded together with the probe body 106 for a single, albeit different, needle-insertion angle with each different needle guide of the one-or-more needle guides 134. Alternatively, such a needle-guide holder can be configured to rotate toward and away from the patient-facing side of, for example, the ultrasound probe 302 like the needle-guide holder 310. Configured as such, the needle-guide holder 310 can be rotated toward and away from the patient-facing side of the ultrasound probe 302 for a number of different needle-insertion angles with each different needle guide of the one-or-more needle guides 134. Notably, the needle-guide holder 110 of the ultrasound probe 102 is advantageous in that the needle-insertion angle merely depends upon that provided by a selected needle guide, which reduces procedural complexity. That said, the needle-guide holder 310 of the ultrasound probe 302 is advantageous in that the needle-insertion angle can be more finely tuned between a position of the needle-guide holder 310 and the selected needle guide.

The needle-guide holder 310 can include a locking feature complementing that of the probe body 306. Indeed, at least one face of a pair of outward-facing faces of the needle-guide holder 310 can include teeth molded therein extending radially from a through hole of the needle-guide holder 310 by which the needle-guide holder 310 is mounted on the axle 313 of the probe body 306. The foregoing teeth complement those of the probe body 306, thereby forming the Hirth joint therebetween as set forth above. Again, such a locking feature is configured to lock the needle-guide holder 310 in any one of a number of different positions corresponding to different needle-insertion angles.

The stabilizer 112 is configured for hands-free stabilization of the ultrasound probe 102 or 302 when the ultrasound probe 102 or 302 is placed on a patient. As shown, the stabilizer 112 can include two arcuate stabilizer arms 118 of the housing extending from opposite sides of the probe body 106 or 306; however, the stabilizer 112 is not limited thereto. Indeed, the stabilizer arms 118 need not be of the housing. For example, the stabilizer arms 118 can instead be separate rods or tubes coupled to the probe body 106 or 306. In addition, the stabilizer arms 118 can alternatively be linear instead of arcuate. In an example, the stabilizer arms 118 can form a 'V' shape with the probe body 106 or 306 at the vertex of the 'V.' In another example, the stabilizer arms 118 can form a 'U' shape with the probe body 106 or 306 at the bottom of the 'U.' Not only that, but ends of the stabilizer arms 118 can alternatively be connected. Connection of the ends of the stabilizer arms 118 yields an annular stabilizer when the stabilizer arms 118 are arcuate, a triangular stabilizer when the stabilizer arms 118 form the 'V' shape with the probe body 106 or 306, and a rectangular stabilizer when the stabilizer arms 118 form the 'U' shape with the probe body 106 or 306.

As best shown in FIG. 3, the stabilizer 112 can include hooks 120 in a patient-facing side of the stabilizer 112 configured for fastening the pad 104, 204, or 304 to the stabilizer 112. Indeed, each stabilizer arm of the stabilizer arms 118 can include the hooks 120 molded in the patient-facing side of the stabilizer 112 for fastening the pad 104, 204, or 304 to the stabilizer 112. As set forth below, each pad arm of the pad arms 124 can correspondingly include the wells 128 in the clinician-facing side of the pad 104, 204, or 304. The hooks 120 are configured to be disposed in the wells 128 under latches 130 partially covering the wells 128 for fastening the pad 104, 204, or 304 to the stabilizer 112. Notably, the stabilizer 112 is not limited to the hooks 120 for fasteners nor the pad 104, 204, or 304 limited to the corresponding wells 128 for fasteners. In fact, the fasteners need not be present on either the stabilizer 112 or the pad 104, 204, or 304 as the stabilizer 112 can include a relatively flat surface on the patient-facing side thereof configured for adhering the pad 104, 204, or 304 to the stabilizer 112. (See, for example, FIG. 7, which illustrates the pad 304 in accordance with such an embodiment.)

The ultrasound probe 102 or 302 can further include one or more magnetic sensors 122 configured to detect changes in a magnetic field due to a magnetized medical device. The changes detected in the magnetic field are, in turn, processed for guiding the medical device to a selected anatomical target while ultrasonically imaging the anatomical target. For example, the magnetized medical device can be the needle 138 and the anatomical target a blood vessel, wherein the one-or-more magnetic sensors 122 are configured to detect changes in a magnetic field due to the needle 138 for guiding the needle 138 to the blood vessel while ultrasonically imaging the blood vessel. The one-or more magnetic sensors 122 can be disposed in the probe body 106 or 306 proximate the patient-facing side of the ultrasound probe 102 or 302 and oriented in a same direction as the needle-guide holder 110 or 310 that extends from the probe body 106 or 306. (See, for example, FIG. 2.) The one-or-more magnetic sensors 122 can additionally or alternatively be disposed in the stabilizer 112 and oriented toward the needle-guide holder 110 or 310. Indeed, a plurality of the magnetic sensors 122 can be distributed among the probe body 106 or 306 and the stabilizer 112 such as along the stabilizer arms 118. In this way, the magnetic sensors 122 can encircle the needle-guide holder 110 or 310 and detect changes in a magnetic field due to the magnetized medical device from a variety of different angles for guiding the medical device to the anatomical target while ultrasonically imaging the anatomical target.

The pad 104, 204, or 304 is configured to interface with a skin surface of a patient. Indeed, the pad 104, 204, or 304 includes an adhesive (e.g., a silicone adhesive, a hydrogel, etc.) configured to adhere the pad 104, 204, or 304 to the skin surface of the patient. In consideration of the foregoing, the pad 104, 204, or 304 is intended for use on a single patient, after which it is disposed. In this way, the ultrasound probe 102 or 302, which is capital equipment, can safely be used on multiple patients with suitable cleaning of the ultrasound probe 102 or 302 between successive patients.

Like the stabilizer 112 to which the pad 104, 204, or 304 is configured to couple, the pad 104, 204, or 304 can include two arcuate pad arms 124 coextensive with the two stabilizer arms 118; however, like the stabilizer 112, the pad 104, 204, or 304 is not limited thereto. Indeed, the pad arms 124 are generally coextensive with the stabilizer arms 118. As such, the pad arms 124 can alternatively be linear instead of arcuate. In an example, the pad arms 124 can form a 'V' shape with each pad arm of the two pad arms 124 connected at the vertex of the 'V.' In another example, the pad arms 124 can likewise form a 'U' shape with each pad arm of the two pad arms 124 connected at the bottom of the 'U.' Notably, such embodiments of the pad 104, 204, or 304 among others include an ultrasound window 126 configured to align with the acoustic lens 116 of the probe head 108 to allow generated ultrasound signals to be emitted from the ultrasonic transducers 114 and reflected ultrasound signals to be received by the ultrasonic transducers 114. Lastly, ends of the pad arms 124 opposite those connected in the 'V' shape, the 'U' shape, or the like can also be connected like the ends of the stabilizer arms 118. Connection of the foregoing ends of the pad arms 124 yields an annular pad when the pad arms 124 are arcuate, a triangular pad when the pad arms 124 form the 'V' shape, and a rectangular pad when the pad arms 124 form the 'U' shape.

Figure 10:
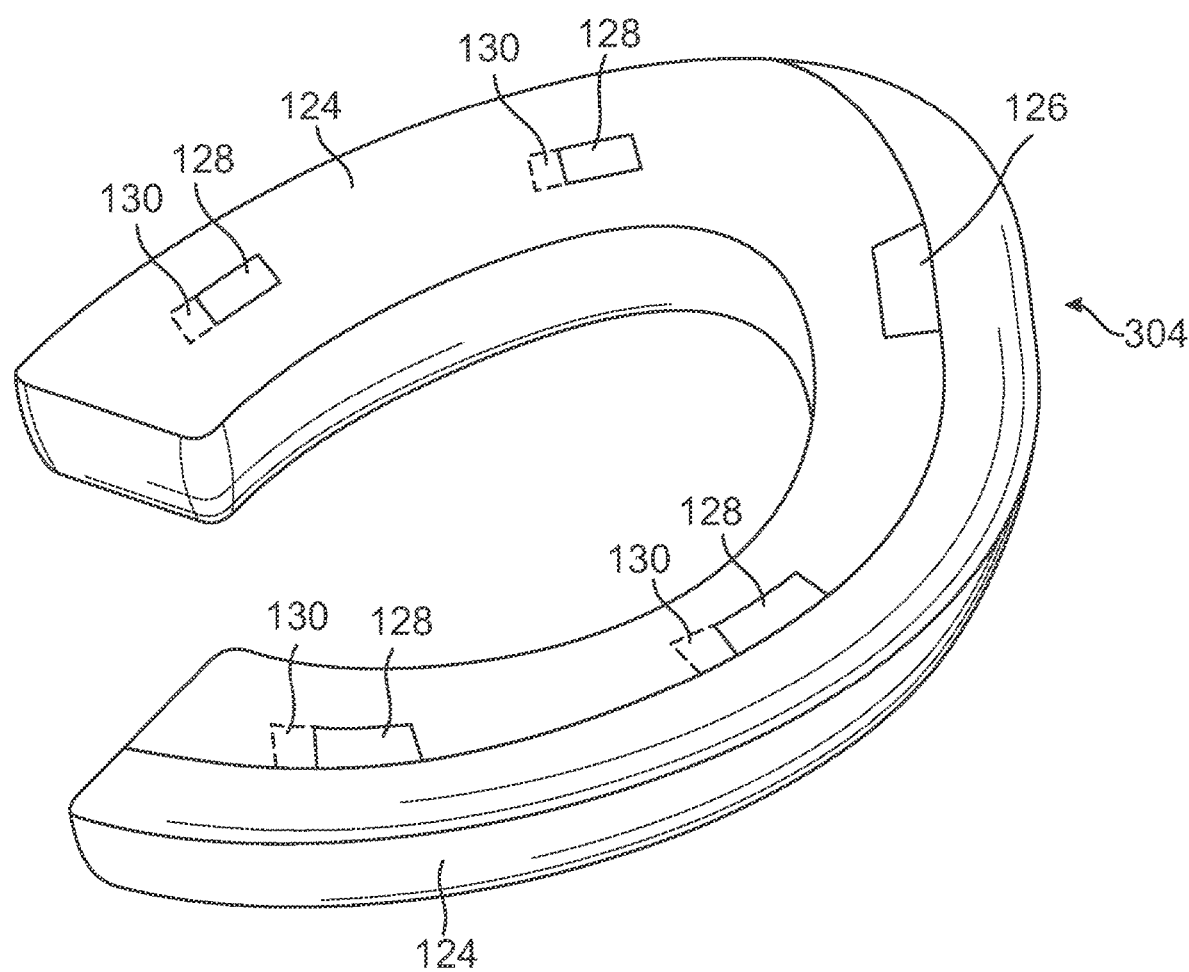
FIG. 10 illustrates a perspective view of the pad of FIG. 6 decoupled from the ultrasound probe.

As best shown in FIGS. 3 and 10, the pad 104, 204, or 304 can include wells 128 in a clinician-facing side of the pad 104, 204, or 304 configured for fastening the pad 104, 204, or 304 to the stabilizer 112. Indeed, each pad arm of the pad arms 124 can include the wells 128 molded in the clinician-facing side of the pad 104, 204, or 304 for fastening the pad 104, 204, or 304 to the stabilizer 112. As set forth above, each stabilizer arm of the stabilizer arms 118 can correspondingly include the hooks 120 in the patient-facing side of the stabilizer 112. The hooks 120 are configured to be disposed in the wells 128 under latches 130 partially covering the wells 128 for fastening the pad 104, 204, or 304 to the stabilizer 112. Notably, the pad 104, 204, or 304 is not limited to the wells 128 for fasteners nor the stabilizer 112 limited to the corresponding hooks 120 for fasteners. In fact, the fasteners need not be present on either the pad 104, 204, or 304 or the stabilizer 112 as the pad 104, 204, or 304 can include an adhesive configured for adhering the pad 104, 204, or 304 to the stabilizer 112 when the stabilizer 112 includes the relatively flat surface on the patient-facing side as set forth above. (See, for example, FIG. 7, which illustrates the pad 304 in accordance with such an embodiment.)

The pad 104, 204, or 304 can be contoured in accordance with different interfacing modes for interfacing with a patient. As shown in FIGS. 1-3, for example, a patient-facing portion of the pad 104 can be contoured with an outer portion of the pad 104 thicker than an inner portion of the pad 104 such that the pad 104 conforms with a curved skin surface (e.g., a skin surface of a limb such as an arm or leg) of the patient when placed thereon. Indeed, as best shown in FIG. 2, the patient-facing portion of the pad 104 is radiused such that the pad 104 conforms with the curved skin surface of the patient when placed thereon. As shown in FIGS. 4 and 5, for example, the patient-facing portion of the pad 204 can alternatively include two contoured pad-arm extensions 132 extending away from the clinician-facing side of the pad 204 configured to conformably straddle a limb (e.g., an arm or leg) of the patient. Like the pad 104 shown in FIGS. 1-3, the pad 204 of FIGS. 4 and 5 is radiused as best shown in FIG. 5 such that the pad 204 conforms with the limb of the patient when placed thereover. Regardless of the interfacing mode, the patient-facing portion of the pad 104, 204, or 304 is formed of a conformable material (e.g., a gel) with rounded edges for patient comfort.

The ultrasound-probe assembly 100, 200, or 300 or the ultrasound probe 102 or 302 thereof can further include one or more needle guides 134 configured to attach to the needle-guide holder 110 or 310. Each needle guide of the one-or-more needle guides 134 includes a needle through hole 136 configured to direct the needle 138 inserted or otherwise disposed in the needle through hole 136 into a selected anatomical target (e.g., a blood vessel) of a patient under the probe head 108. Indeed, each needle guide of the one-or-more needle guides 134 is configured to direct the needle 138 or the like into the patient at a different needle-insertion angle for optimum access to the selected anatomical target under the probe head 108. As set forth above, however, the needle-insertion angle can be a function of the needle-guide holder 110 or 310 and a selected needle guide. Indeed, the needle-guide holder 110 is fixed while the needle-guide holder 310 is rotatable such that the needle-insertion angle with the needle-guide holder 110 merely depends upon that provided by the selected needle guide and the needle-insertion angle with the needle-guide holder 310 depends upon rotation of the needle-guide holder 310 in combination with that provided by the selected needle guide.

Some needle-guide examples are disclosed in U.S. Pat. No. 10,863,970, which is incorporated by reference in its entirety into this application.

The ultrasound-probe assembly 100, 200, or 300 or the ultrasound probe 102 or 302 thereof can further include one or more needles 138 configured access a selected anatomical target of a patient as set forth above.

Ultrasound Systems

Figure 11:
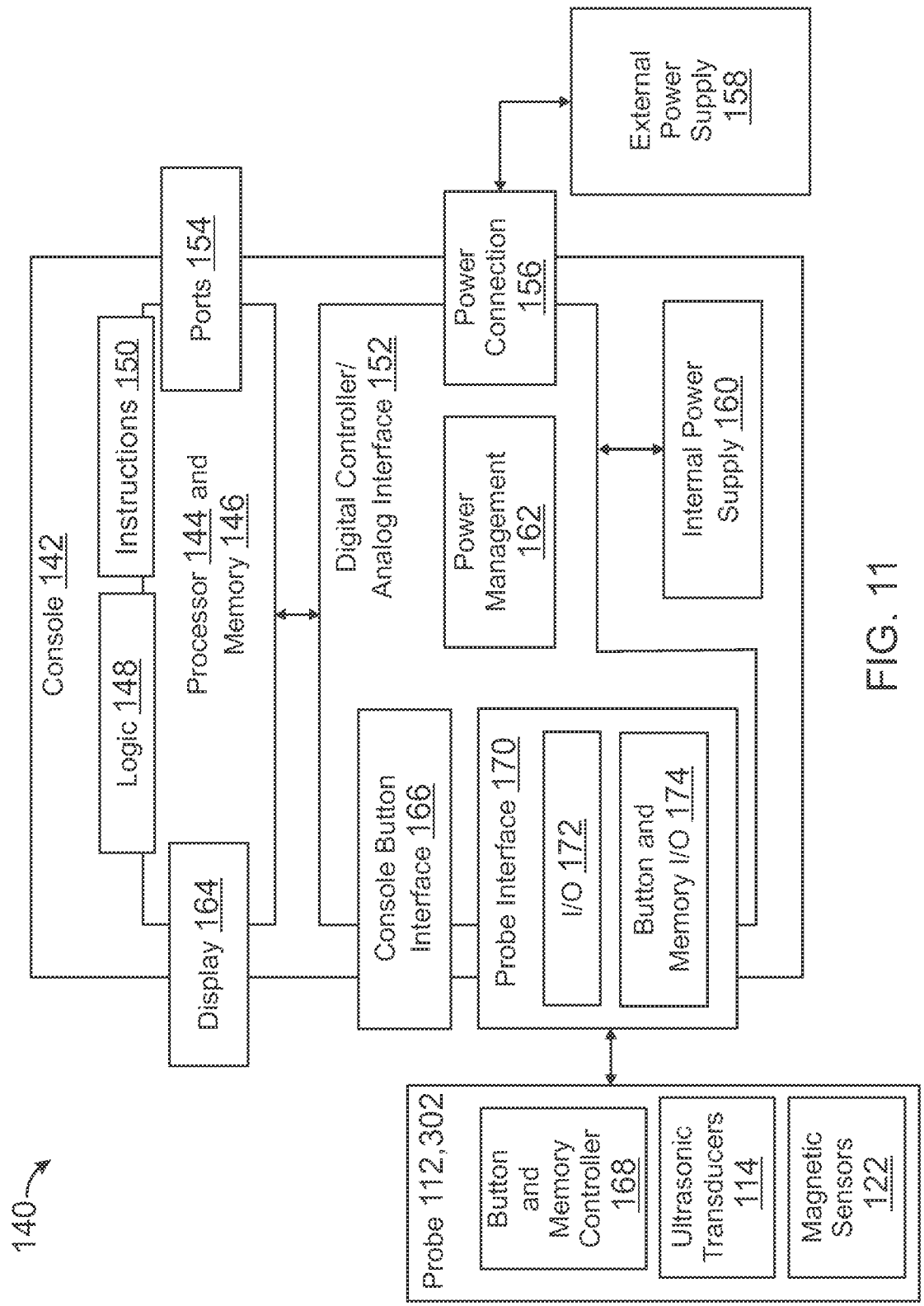
FIG. 11 illustrates a block diagram of an ultrasound system in accordance with some embodiments.

FIG. 11 illustrates a block diagram of an ultrasound system 140 in accordance with some embodiments.

As shown, the ultrasound system 140 includes the ultrasound-probe assembly 100, 200, or 300 and a console 142.

The console 142 houses a variety of components including a processor 144 and memory 146 such as random-access memory ("RAM") or non-volatile memory (e.g., electrically erasable programmable read-only memory ["EEPROM"]) for controlling various functions of the ultrasound system 140 as well as executing various logic operations or algorithms via logic 148 during operation of the ultrasound system 140. For example, the console 142 is configured to instantiate by way of executable instructions 150 stored in the memory 146 and executed by the processor 144 one or more processes for controlling the various functions of the ultrasound system 140 including processing electrical signals from the ultrasonic transducers 114 of the ultrasound probe 102 or 302 into ultrasound images and processing electrical signals from the one-or-more magnetic sensors 122 of the ultrasound probe 102 or 302 into on-screen visual guidance for a magnetized medical device (e.g., the needle 138), etc. Indeed, the one-or-more processes can include beamforming by way of a beamformer configured to drive the ultrasonic transducers 114 as well as receive, amplify, and digitize the reflected ultrasound signals; signal processing by way of a signal processor configured to detect an amplitude of each of the foregoing reflected ultrasound signals or the digitized signals corresponding thereto; and image processing by way of an image processor configured to manage storage of detected amplitudes and send ultrasound images corresponding to collections of the detected amplitudes to the display screen of the display 164 upon completion of the ultrasound images. A digital controller/analog interface 152 is also included with the console 142 and is in communication with both the processor 144 and other system components to govern interfacing between the ultrasound probe 102 or 302 and other system components.

A controller of the console 142, optionally implemented between the processor 144 and the memory 146 of the console 142, is communicatively coupled to the one-or-more magnetic sensors 122 of the ultrasound probe 102 or 302. The controller is configured to convert electrical signals from the one-or-more magnetic sensors 122 into on-screen visual guidance for a magnetized medical device (e.g., the needle 138), the electrical signals corresponding to detected changes in a magnetic field due to the magnetized medical device being in the presence of the one-or-more magnetic sensors 122. Notably, the logic 148 of the console 142 is configured to analyze the detected changes in view of the ultrasound images in real-time for the on-screen visual guidance. The display 164 is configured to emit a visual signal on the display screen to alert a clinician when a trajectory of the magnetized medical device does not align with a selected anatomical target (e.g., a blood vessel). The console 142 can also include a speaker (not shown) configured to emit an audio signal to alert the clinician when the trajectory of the magnetized medical device does not align with the selected anatomical target.

Some examples of magnetic-based needle guidance are disclosed in U.S. Pat. Nos. 8,388,541; 8,781,555; 8,849,382; 9,456,766; 9,492,097; 9,521,961; 9,554,716; 9,636,031; 9,649,048; 10,449,330; 10,524,691; and 10,751,509, each of which is incorporated by reference in its entirety into this application.

The ultrasound system 140 further includes ports 154 for connection with additional components such as optional components including a printer, storage media, a keyboard, etc. The ports 154 can be universal serial bus ("USB") ports, though other types of ports can be used for this connection or any other connections shown or described herein.

A power connection 156 is included with the console 142 to enable an operable connection to an external power supply 158. An internal power supply 160 (e.g., a battery) can also be employed either with or exclusive of the external power supply 158. Power management circuitry 162 is included with the digital controller/analog interface 152 of the console 142 to regulate power use and distribution.

A display 164 including a display screen integrated into the console 142 is configured to provide a graphical user interface ("GUI") on the display screen, render one or more ultrasound images of an anatomical target (e.g., a blood vessel) attained by the ultrasound probe 102 or 302 on the display screen, and display any related information on the display screen such as graphical elements in on-screen visual guidance for a magnetized medical device (e.g., the needle 138) to a selected anatomical target (e.g., a blood vessel) while attaining the one-or-more ultrasound images. In addition, the display 164 can be configured to display visual feedback including a visualization of the selected anatomical target and a VAD such as a catheter placed in the selected anatomical target. Notwithstanding the foregoing, the display 164 can alternatively be separate from the console 142 and communicatively coupled thereto. Control buttons (see FIG. 1) accessed through a console button interface 166 of the console 142 can be used to immediately call up a desired mode of the ultrasound system 140 to the display screen for assistance in an ultrasound-based medical procedure such as assessing the foregoing selected anatomical target or placing a VAD therein.

Adverting briefly back to the ultrasound probe 102 or 302, the ultrasound probe 102 or 302 includes a button-and-memory controller 168 configured for operable communication with a probe interface 170 of the console 142, which includes an input/output ("I/O") component 172 for interfacing with the ultrasonic transducers 114 and a button-and-memory I/O component 174 for interfacing with the button-and-memory controller 168.

Methods

Methods include a method of establishing an insertion site with the ultrasound system 140. Such a method includes one or more steps selected from an obtaining step, an assembling step, a moving step, a monitoring step, an attaching step, an adhering step, a rotating step, a needle-inserting step, and another monitoring step.

The obtaining step includes obtaining the ultrasound probe 102 or 302. As set forth above, the ultrasound probe 102 or 302 includes the probe body 106 or 306, the stabilizer 112 extending from the probe body 106 or 306, and the probe head 108 in the patient-facing portion of the probe body 106 or 306.

The assembling step includes fastening the single-use pad 104, 204, or 304 to the patient-facing side of the ultrasound probe 102 or 302 to form the ultrasound-probe assembly 100, 200, or 300. Fastening the pad 104, 204, or 304 to the ultrasound probe 102 or 302 includes inserting hooks 120 of the patient-facing side of the stabilizer 112 into the wells 128 of the clinician-facing side of the pad 104, 204, or 304 and sliding the hooks 120 under the latches 130 that partially covering the wells 128.

The moving step includes moving the ultrasound-probe assembly 100, 200, or 300 over the patient while the ultrasound probe 102 or 302 emits generated ultrasound signals into the patient from the ultrasonic transducers 114 in the probe head 108 and receives reflected ultrasound signals from the patient by the ultrasonic transducers 114.

The monitoring step includes monitoring ultrasound images on the display screen of the ultrasound system 140 to identify an anatomical target of the patient.

The attaching step includes attaching a selected needle guide to the needle-guide holder 110 or 310 extending from the probe body 106 or 306. The selected needle guide like any of the one-or-more needle guides 134 includes the needle through hole 136 configured to direct the needle 138 into the patient under the probe head 108. The selected needle guide is selected from others of the one-or-more needle guides 134 for the needle-inserting step at a particular needle-insertion angle.

The adhering step includes adhering the pad 104, 204, or 304 to the patient over a selected anatomical target after identification thereof during the monitoring step. Adhering the pad 104, 204, or 304 to the patient advantageously allows for hands-free ultrasound imaging so a clinician can use both hands for other steps including the needle-inserting step. As set forth above, the pad 104, 204, or 304 includes the adhesive for the adhering of the pad 104, 204, or 304 to the patient in the adhering step.

The rotating step includes rotating the needle-guide holder 310 toward or away from the patient-facing side of the ultrasound probe 302 for the needle-inserting step at a particular needle-insertion angle. As set forth above, the needle-guide holder 310 can be locked into position by way of the complementary locking features of the Hirth joint between the needle-guide holder 310 and the probe body 306. As such, the rotating step can include locking the needle-guide holder 310 in position at the particular needle-insertion angle.

The needle-inserting step includes inserting the needle 138 into the selected anatomical target while the ultrasound-probe assembly 100, 200, or 300 is stabilized by the stabilizer 112 with hands-free stabilization over the anatomical target.

The other monitoring step includes monitoring on-screen visual guidance of the needle, if magnetized, on the display screen. The ultrasound probe 102 or 302 further includes the one-or-more magnetic sensors 122 configured to detect changes in a magnetic field due to the needle 138 for the on-screen visual guidance. If the on-screen visual guidance indicates the trajectory of the needle 138 does not align with the selected anatomical target, the console 142 can be configured to emit a visual or audible signal to alert the clinician such that the clinician can adjust the needle-guide holder 310 or swap out the selected needle guide for another needle guide for a different needle-insertion angle during the needle-insertion step.

Following on one or more of the foregoing steps including at least the needle-inserting step, a VAD such as a catheter (e.g., a peripheral intravenous catheter ["PIVC"] or midline catheter) can be placed in the selected anatomical target by way of an insertion site or a needle tract thereof established by the needle 138 during the needle-inserting step. Placing the VAD can be further monitored by the on-screen visual guidance if the VAD is magnetized or includes a magnetized element therein.

While some particular embodiments have been disclosed herein, and while the particular embodiments have been disclosed in some detail, it is not the intention for the particular embodiments to limit the scope of the concepts provided herein. Additional adaptations or modifications can appear to those of ordinary skill in the art, and, in broader aspects, these adaptations or modifications are encompassed as well. Accordingly, departures may be made from the particular embodiments disclosed herein without departing from the scope of the concepts provided herein.

What is claimed is:

1. An ultrasound-probe assembly, comprising:
   an ultrasound probe including:
     a probe body;
     a stabilizer extending from the probe body, the stabilizer configured for hands-free stabilization of the ultrasound probe when the ultrasound probe is placed on a patient;
     a probe head in a patient-facing portion of the probe body, the probe head including ultrasonic transducers in an array; and
     a needle-guide holder extending from the probe body; and
   a single-use pad coupled to a patient-facing side of the stabilizer, the single-use pad configured to interface with a skin surface of the patient,
   wherein:
     the stabilizer includes first and second elongated arcuate stabilizer arms extending along the patient-facing side of the ultrasound probe,
     the first and second elongated arcuate stabilizer arms extend:
       away from opposite right and left sides of the probe body, respectively, and
       away from a front side of the probe body, and
       a consistent distance between mid-sections of the first and second elongated arcuate stabilizer arms is greater than a consistent distance between free end sections of the first and second elongated arcuate stabilizer arms.

2. The ultrasound-probe assembly of claim 1, wherein the needle-guide holder extends between the first and second elongated arcuate stabilizer arms.

3. The ultrasound-probe assembly of claim 1, wherein the needle-guide holder is configured to rotate toward and away from the patient-facing side of the stabilizer for different needle-insertion angles with a needle disposed in a needle through hole of a needle guide coupled to the needle-guide holder.

4. The ultrasound-probe assembly of claim 3, wherein the probe body and the needle-guide holder include complementary locking features where the needle-guide holder extends from the probe body, the complementary locking features configured to lock the needle-guide holder in different positions for the different needle-insertion angles.

5. The ultrasound-probe assembly of claim 1, further comprising one or more needle guides configured to attach to the needle-guide holder, each needle guide of the one or more needle guides including a needle through hole configured to direct a needle into the patient under the probe head.

6. The ultrasound-probe assembly of claim 5, wherein each needle guide of the one or more needle guides is configured for inserting the needle into the patient at a different needle-insertion angle.

7. The ultrasound-probe assembly of claim 1, wherein each stabilizer arm of the first and second elongated arcuate stabilizer arms includes hooks in the patient-facing side of the stabilizer fastening the stabilizer to the single-use pad.

8. The ultrasound-probe assembly of claim 7, wherein the single-use pad includes two arcuate pad arms coextensive with the first and second elongated arcuate stabilizer arms, each single-use pad arm of the two arcuate pad arms including wells in a clinician-facing side of the single-use pad, in which the hooks are correspondingly disposed under latches that at least partially cover the wells.

9. The ultrasound-probe assembly of claim 8, wherein each single-use pad arm of the two arcuate pad arms connect under the probe head, the single-use pad including an ultrasound window configured to allow generated ultrasound signals to be emitted from the ultrasonic transducers and reflected ultrasound signals to be received by the ultrasonic transducers.

10. The ultrasound-probe assembly of claim 1, wherein a patient-facing portion of the single-use pad is formed of a conformable material.

11. The ultrasound-probe assembly of claim 10, wherein the single-use pad includes an adhesive configured to adhere the single-use pad to the skin surface of the patient.

12. The ultrasound-probe assembly of claim 10, wherein the patient-facing portion of the single-use pad is contoured with an outer portion of the single-use pad thicker than an inner portion of the single-use pad such that the single-use pad conforms with the skin surface of the patient.

13. The ultrasound-probe assembly of claim 10, wherein the patient-facing portion of the single-use pad includes two contoured pad-arm extensions extending away from the stabilizer, the two contoured pad-arm extensions configured to conformably straddle a limb of the patient.

14. The ultrasound-probe assembly of claim 1, the ultrasound probe further comprising one or more magnetic sensors configured to detect changes in a magnetic field of a magnetized needle for visual guidance of the magnetized needle to an anatomical target on a display screen while ultrasonically imaging the anatomical target.

15. The ultrasound-probe assembly of claim 1, wherein the first and second elongated arcuate stabilizer arms define an opening between the first and second elongated arcuate stabilizer arms, and the first and second elongated arcuate stabilizer arms extend more than 180 degrees around the opening.

16. The ultrasound-probe assembly of claim 1, wherein the first and second elongated arcuate stabilizer arms define an opening between the first and second elongated arcuate stabilizer arms, and the needle-guide holder extends over the opening.

17. The ultrasound-probe assembly of claim 1, wherein the stabilizer and the probe body combine to define a smooth continuous back side perimeter edge of the ultrasound-probe assembly.

18. The ultrasound-probe assembly of claim 1, wherein the probe body is located on an outside perimeter of the stabilizer.

19. An ultrasound system, comprising:
 a console including a display configured to render ultrasound images on a display screen of the display; and
 an ultrasound-probe assembly including:
  an ultrasound probe including:
   a probe body;
   a stabilizer extending from the probe body, the stabilizer configured for hands-free stabilization of the ultrasound probe when the ultrasound probe is placed on a patient;
   a probe head in a patient-facing portion of the probe body, the probe head including ultrasonic transducers in an array; and
   a needle-guide holder extending from the probe body; and
  a single-use pad coupled to a patient-facing side of the stabilizer, the single-use pad configured to interface with a skin surface of the patient,
 wherein:
  the stabilizer includes first and second elongated arcuate stabilizer arms extending along the patient-facing side of the ultrasound probe,
  the first and second elongated arcuate stabilizer arms extend:
   away from opposite right and left sides of the probe body, respectively, and
   away from a front side of the probe body, and
  a consistent distance between mid-sections of the first and second elongated arcuate stabilizer arms is greater than a consistent distance between free end sections of the first and second elongated arcuate stabilizer arms.

20. The ultrasound system of claim 19, wherein the console and the display are further configured to provide visual guidance for a magnetized needle of the ultrasound-probe assembly to an anatomical target on the display screen of the display, the ultrasound probe further including one or more magnetic sensors configured to detect changes in a magnetic field of the magnetized needle for the visual guidance.

* * * * *